United States Patent
Modha et al.

(10) Patent No.: US 6,952,700 B2
(45) Date of Patent: Oct. 4, 2005

(54) FEATURE WEIGHTING IN κ-MEANS CLUSTERING

(75) Inventors: Dharmendra Shantilal Modha, San Jose, CA (US); William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 09/813,896

(22) Filed: Mar. 22, 2001

(65) Prior Publication Data

US 2003/0005258 A1 Jan. 2, 2003

(51) Int. Cl.$^7$ ............................................... G06F 17/00
(52) U.S. Cl. ........................................ 707/101; 707/100
(58) Field of Search ............................... 707/100, 101, 707/104.1

(56) References Cited

U.S. PATENT DOCUMENTS

| | | | | |
|---|---|---|---|---|
| 5,596,719 A | * | 1/1997 | Ramakrishnan et al. | .... 709/241 |
| 5,729,628 A | * | 3/1998 | Tokuyama | .................. 382/173 |
| 6,115,708 A | | 9/2000 | Fayyad et al. | |
| 6,363,327 B1 | * | 3/2002 | Wallet et al. | .................. 702/11 |
| 6,381,505 B1 | * | 4/2002 | Kassmann et al. | ............ 700/44 |
| 6,529,916 B2 | * | 3/2003 | Bergman et al. | ............ 707/104 |

OTHER PUBLICATIONS

Sato et al "Fuzzy clustering model for fuzzy data", IEEE 1995, pp. 2123–2128.*
Ben–Tal et al "Rate distortion theory with generalized information measures via convex programming duality", IEEE pp. 630–641.*

* cited by examiner

*Primary Examiner*—Uyen Le
(74) *Attorney, Agent, or Firm*—McGinn & Gibb, PLLC; Leonard T. Guzman, Esq.

(57) ABSTRACT

A method and system is provided for integrating multiple feature spaces in a k-means clustering algorithm when analyzing data records having multiple, heterogeneous feature spaces. The method assigns different relative weights to these various features spaces. Optimal feature weights are also determined that lead to a clustering that simultaneously minimizes the average intra-cluster dispersion and maximizes the average inter-cluster dispersion along all the feature spaces. Examples are provided that empirically demonstrate the effectiveness of feature weighting in clustering using two different feature domains.

24 Claims, 9 Drawing Sheets

FEATURE WEIGHTING IN κ-MEANS CLUSTERING

BACKGROUND OF THE INVENTION

1. Field of the Invention

The present invention generally relates to data clustering and in particular, concerns a method and system for providing a framework for integrating multiple, heterogeneous feature spaces in a k-means clustering algorithm.

2. Description of the Related Art

Clustering, the grouping together of similar data points in a data set, is a widely used procedure for analyzing data for data mining applications. Such applications of clustering include unsupervised classification and taxonomy generation, nearest-neighbor searching, scientific discovery, vector quantization, text analysis and navigation, data reduction and summarization, supermarket database analysis, customer/market segmentation, and time series analysis.

One of the more popular techniques for clustering data of a set of data records includes partitioning operations (also referred to as finding pattern vectors) of the data using a k-means clustering algorithm which generates a minimum variance grouping of data by minimizing the sum of squared Euclidean distances from cluster centroids. The popularity of the k-means clustering algorithm is based on its case of interpretation, simplicity of use, scalability, speed of convergence, parallelizability, adaptability to sparse data, and ease of out-of-core use.

The k-means clustering algorithm functions to reduce data. Initial cluster centers are chosen arbitrarily. Records from the database are then distributed among the chosen cluster domains based on minimum distances. After records are distributed, the cluster centers are updated to reflect the means of all the records in the respective cluster domains. This process is iterated so long as the cluster centers continue to move and converge and remain static. Performance of this algorithm is influenced by the number and location of the initial cluster centers, and by the order in which pattern samples are passed through the program.

Initial use of the k-means clustering algorithm typically requires a user or an external algorithm to define the number of clusters. Second, all the data points within the data set are loaded into the function. Preferably, the data points are indexed according to a numeric field value and a record number. Third, a cluster center is initialized for each of the predefined number of clusters. Each cluster center contains a random normalized value for each field within the cluster. Thus, initial centers are typically randomly defined. Alternatively, initial cluster center values may be predetermined based on equal divisions of the range within a field. In a fourth step, a routine is performed for each of the records in the database. For each record number from one to the current record number, the cluster center closest to the current record is determined. The record is then assigned to that closest cluster by adding the record number to the list of records previously assigned to the cluster. In a fifth step, after all of the records have been assigned to a cluster, the cluster center for each cluster is adjusted to reflect the averages of data values contained in the records assigned to the cluster. The steps of assigning records to clusters and then adjusting the cluster centers is repeated until the cluster centers move less than a predetermined epsilon value. At this point the cluster centers are viewed as being static.

A fundamental starting point for machine learning, multivariate statistics, or data mining, is where a data record can be represented as a high-dimensional feature vector. In many traditional applications, all of the features are essentially of the same type. However, many emerging data sets are often have many different feature spaces, for example:

Image indexing and searching systems use at least four different types of features: color, texture, shape, and location.

Hypertext documents contain at least three different types of features: the words, the out-links, and the in-links.

XML has become a standard way to represent data records; such records may have a number of different textual, referential, graphical, numerical, and categorical features.

Profile of a typical on-line customer such as an Amazon.com customer may contain purchased books, music, DVD/video, software, toys, etc. These above examples illustrate that data sets with multiple, heterogeneous features are indeed natural and common. In addition, many data sets on the University of California Irvine Machine Learning and Knowledge Discovery and Data Mining repositories contain data records with heterogeneous features. Data clustering is an unsupervised learning operation whose output provides fundamental techniques in machine learning and statistics. Statistical and computational issues associated with the k-means clustering algorithm have extensively been used for these clustering operations. The same cannot be said, however, for another key ingredient for multidimensional data analysis: clustering data records having multiple, heterogeneous feature spaces.

SUMMARY OF THE INVENTION

The invention provides a method and system for integrating multiple, heterogeneous feature spaces in a k-means clustering algorithm. The method of the invention adaptively selects the relative weights assigned to various features spaces, which simultaneously attains good separation along all of the feature spaces.

The invention integrates multiple feature spaces in a k-means clustering algorithm by assigning different relative weights to these various features spaces. Optimal feature weights are also determined that can be incorporated with this algorithm that lead to a clustering that simultaneously minimizes the average intra-cluster dispersion and maximizes the average inter-cluster dispersion along all the feature spaces.

DESCRIPTION OF THE DRAWINGS

The foregoing will be better understood from the following detailed description of preferred embodiments of the invention with reference to the drawings, in which.

DETAILED DESCRIPTION OF PREFERRED EMBODIMENTS OF THE INVENTION

1. Introduction

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention. Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

Figure 1A:
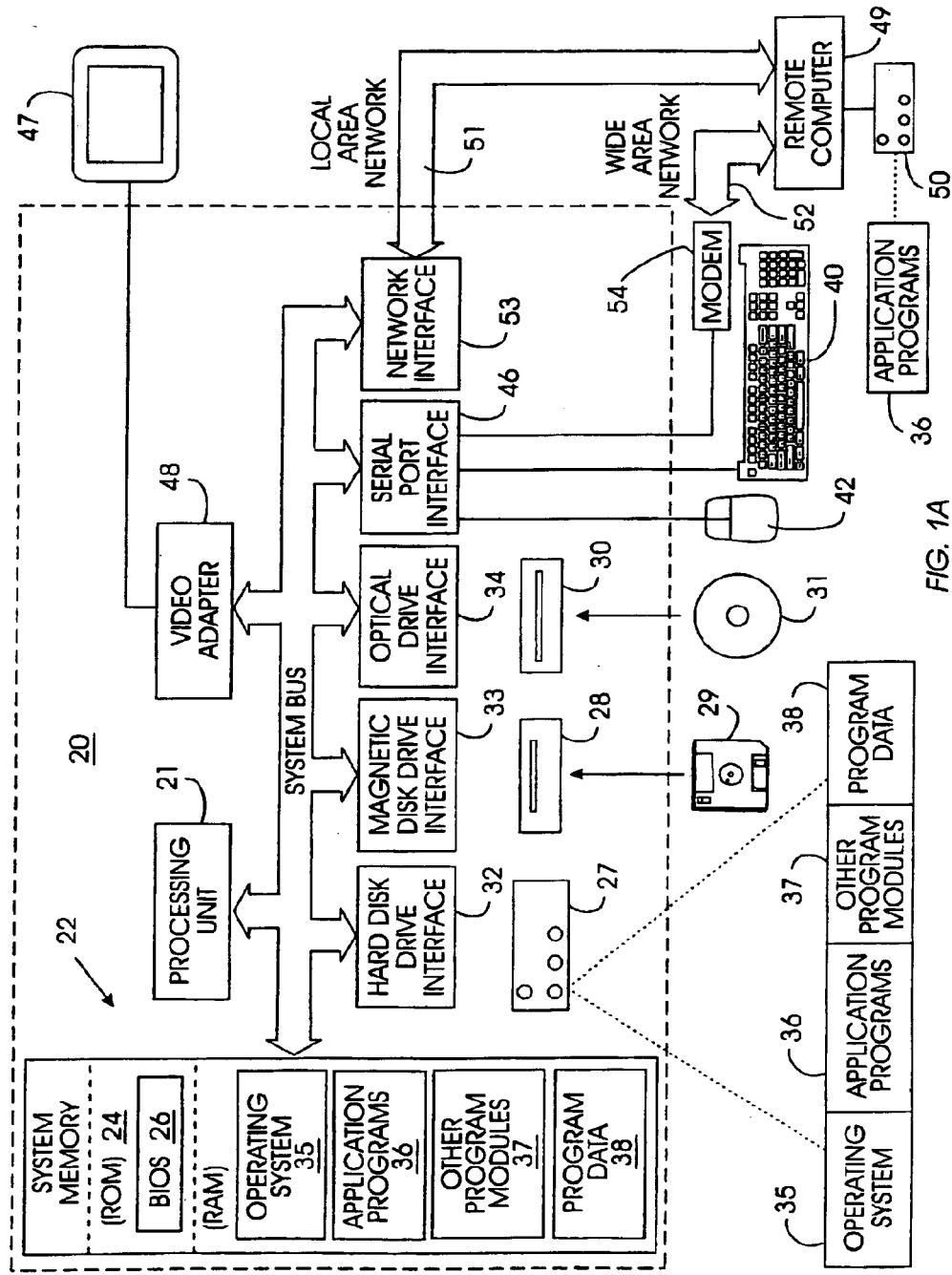
FIGS. 1A and 1B show a data computing system and method of the invention respectively.

FIG. 1A shows an exemplary data processing system for practicing the disclosed feature weighted K-means data clustering analysis methodology that includes a computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment. Data and program instructions can be in the storage area that is readable by a machine, and that tangibly embodies a program of instructions executable by the machine for performing the method of the present invention described herein for data mining applications.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers. The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1A. The logical connections depicted in FIG. 1A include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 1B:
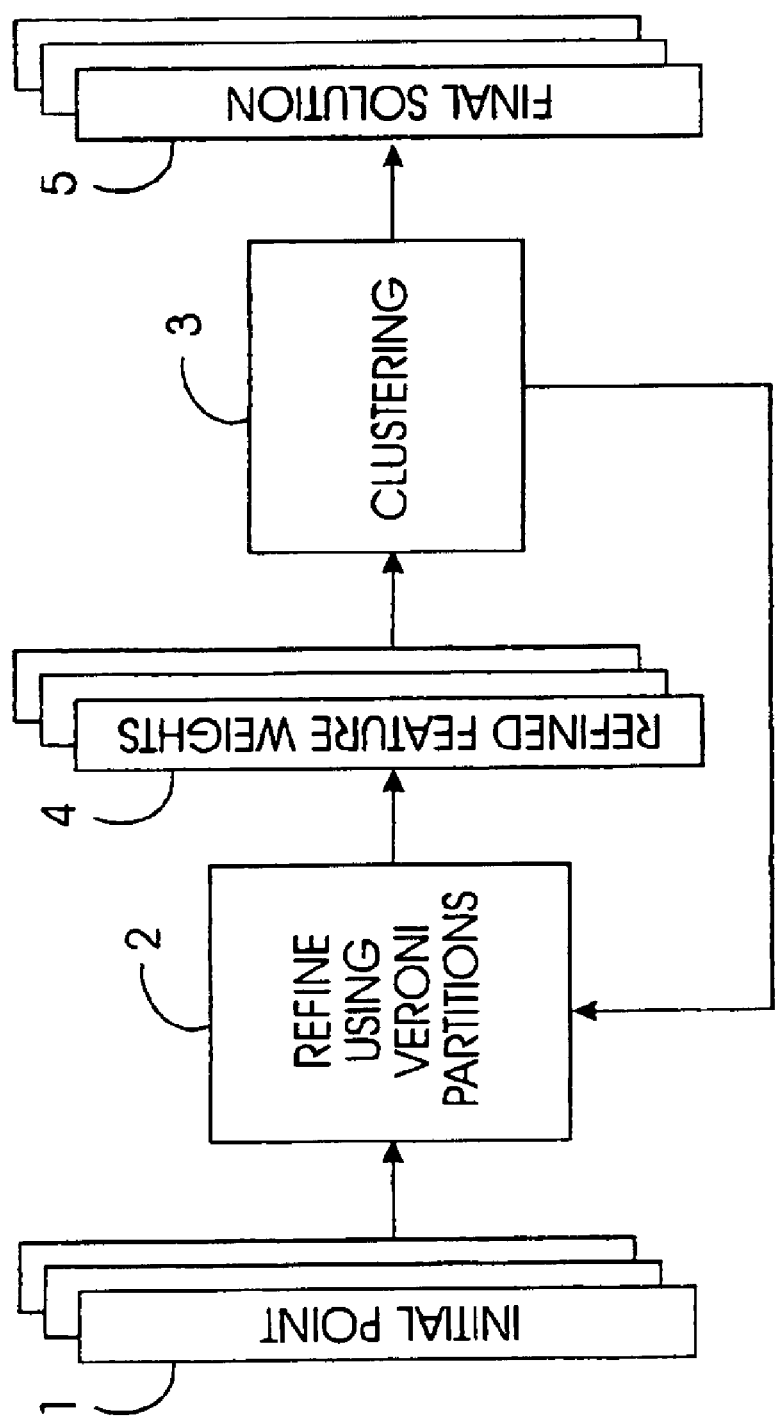

The method of the invention as shown in general form in FIG. 1B, may be implemented using standard programming and/or engineering techniques using computer programming software, firmware, hardware or any combination or sub-combination thereof. Any such resulting program(s), having computer readable program code means, may be embodied or provided within one or more computer readable or usable media such as fixed (hard) drives, disk, diskettes, optical disks, magnetic tape, semiconductor memories such as read-only memory (ROM), etc., or any transmitting/receiving medium such as the Internet or other communication network or link, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

The computer system for implementing the method of the invention can be in the form of software, firmware, hardware or any combination or sub-combination thereof, which embody the invention. One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

The method of the invention is for clustering data, by establishing a starting point at step 1 as shown in FIG. 1B wherein, a given data set having m feature spaces, and each data object (record) is represented as a tuple of m feature vectors. To cluster, a measure of distortion between two data records is needed. Since, different types of features may have radically different statistical distributions, in general, it is unnatural to disregard fundamental differences between various different types of features and to impose a uniform, un-weighted distortion measure across disparate feature spaces. In Section 2 below, a distortion between two data records as a weighted sum of suitable distortion measures on individual component feature vectors is provided; where the distortions on individual components are allowed to be different. In Section 3 below, using a convex programming formulation, the classical Euclidean k-means algorithm is generalized to use the weighted distortion measure. In Section 4 below, optimal feature weight are selected that lead to a clustering that simultaneously minimizes the average intra-cluster dispersion and maximizes the average inter-cluster dispersion along all the feature spaces. In Section 5, an outline evaluation strategy is provided. In Sections 6 and 7, two exemplary uses of the invention are provided for a) clustering data sets with numerical and categorical features; and b) clustering text data sets with words, 2-phrases, and 3-phrases respectively. Using data sets with a known ground truth classification, the clusterings are empirically demonstrated that correspond to the optimal feature weights and deliver nearly optimal precision/recall performance.

Feature weighting may be thought of as a generalization of feature selection where the latter restricts attention to weights that are either 1 (retain the feature) or 0 (eliminate the feature), see Wettschereck et al., *Artificial Intelligence Review* in the article entitled "A review and empirical evaluation of feature weighting methods for a class of lazy learning algorithms," Vol. 11, pps. 273–314, 1997. Feature selection in the context of supervised learning has a long history in machine learning, see, for example, Blum et al., *Artificial Intelligence*, "Selection of relevant features and examples in machine learning," Vol. 97, pps. 245–271, 1997. Feature selection in the context of unsupervised learning has only recently been systematically studied.

2. Data Model and a Distortion Measure 2.1 Data Model: Assume that a set of data records where each object is a tuple of m component feature vectors are given. A typical data object is written as: $x=(F_1, F_2, \ldots F_m)$, where the l-th component feature vector $F_1$ $1<l\leq m$, is to be thought of as a column vector and lies in some (abstract) feature space $F_1$. The data object x lies on the m-fold product feature space $F=F_1 \times F_2 \times \ldots F_m$. The feature spaces $\{F_1\}_{1=1}^m$ can be dimensionally different and possess different topologies, hence, the data model accommodates heterogeneous types of features. There are two examples of feature spaces that include:

Euclidean Case: $F_1$ is either R $f_1 \geq 1$, or some compact submanifold thereof.

Spherical Case: $F_1$ is the intersection of the $f_1$-dimensional, $f_1 \geq 1$, unit sphere with the non-negative orthant of $R^{f_1}$.

2.2 A Weighted Distortion Measure: Measuring distortion between two given two data records $x=(F_1, F_2, \ldots F_m)$ and $\tilde{x}=(\tilde{F}_1, \tilde{F}_2, \ldots \tilde{F}_m)$. For $1\leq l<m$, let $D_1$ denote a distortion measure between the corresponding component feature vectors $F_1$ and $\tilde{F}_1$. Mathematically, only two needed properties of the distortion function:

$D_1$: $F_1 \times F_1 \rightarrow (0, \infty)$.

For a fixed $F_1$, $D_1$ is convex in $\tilde{F}_1$.

Euclidean Case The squared-Euclidean distance:

$$D_1(F_1,\tilde{F}_1)=(F_1-\tilde{F}_1)^T(F_1-\tilde{F}_1)$$

trivially satisfies the non-negativity and, for $\lambda \in [0,1]$, the convexity follows from:

$$D_1(F_1,\lambda \tilde{F}'_1+(1-\lambda)\tilde{F}''_1) \leq \lambda D_1(F_1,\tilde{F}'_1)+(1-\lambda)D_1(F_1,\tilde{F}''_1).$$

Spherical Case The cosine distance $D_1(F_1,\tilde{F}_1)=1-F_1^T \tilde{F}_1$ trivially satisfies the non-negativity and, for $\lambda \in [0,1]$, the convexity follows from:

$$D_l\left(F_l, \frac{\lambda \tilde{F}'_l + (1-\lambda)\tilde{F}''_l}{\|\lambda \tilde{F}'_l + (1-\lambda)\tilde{F}''_l\|}\right) \leq \lambda D_l(F_l, \tilde{F}'_l) + (1-\lambda)D_l(F_l, \tilde{F}''_l),$$

where $\| \ldots \|$ denotes the Euclidean-norm. The division by: $\|\lambda \tilde{F}'_1+(1-\lambda)\tilde{F}''_1\|$ ensures that the second argument of $D_1$ is a unit vector. Geometrically, the convexity along the geodesic are defined as connecting the two unit vectors $\tilde{F}'_1$ and $\tilde{F}''_1$ and not along the chord connecting the two. Given m valid distortion measures $\{D_1\}_{1=1}^m$ between the corresponding m component feature vectors of x and $\tilde{x}$, a weighted distortion measure between x and $\tilde{x}$ is defined as:

$$D^{\alpha}(x, \tilde{x}) = \sum_{l=1}^{m} \alpha_l D_l(F_l, \tilde{F}_l),$$

where the feature weights $\{\alpha_1\}_{1=1}^m$ are non-negative and sum to 1 and $\alpha=(\alpha_1,\alpha_2,\ldots \alpha_m)$. The weighted distortion $D^{\alpha}$ is a convex combination of convex distortion measures, and hence, for a fixed x, $D^{\alpha}$ is the convex in $\tilde{x}$. The feature weights $\{\alpha_1\}_{1=1}^m$ are enabled in the method, and are used to assign different relative importance to component feature vectors. In Section 4 below, appropriate choice of these parameters is made.

3. k-Means with Weighted Distortion 3.1. The Problem: Suppose that n-data records are given such that $$x_i=(F_{(i,1)},F_{(i,2)},\ldots F_{(i,m)}), 1\leq i \leq n,$$

where the l-th, $1\leq l \leq m$, component feature vector of every data record is in the feature space $F_1$. Partitioning of the data set $\{x_i\}_{i=1}^n$ is sought into k-disjoint clusters $\{\pi_u\}_{u=1}^k$.

3.2 Generalized Centroids: Given a partitioning $\{\pi_u\}_{u=1}^k$, for each partition $\pi_u$, write the corresponding generalized centroid as $$c_u=(c_{(u,1)},c_{(u,2)},\ldots, c_{(u,m)}),$$

where, for $1<l>m$, the l-th component $c_{(u,l)}$ is in $F_1$, $c_u$ as the solution of the following convex programming problem is defined as:

$$c_u = \arg \min_{\tilde{x} \in f} \left( \sum_{x \in \pi_u} D^{\alpha(x,\tilde{x})} \right). \quad (1)$$

In an empirical average sense, the generalized centroid may be thought of as being the closest in $D^{\alpha}$ to all the data records in the cluster $\pi_u$. The key to solving (1) is to observe that $D^\alpha$ is component-wise-convex, and, hence, equation (1) can be solved by separately solving for each of its m components $c_{(u,l)}$, $1<l<m$. In other words, the following m convex programming problem is solved:

$$c_{(u,l)} = \arg\min_{\tilde{F}_l \in F_l} \left( \sum_{x \in \pi} D_l(F_l, \tilde{F}_l) \right). \quad (2)$$

For the two feature spaces of interest (others as well), the solution of equation (2) can be written in a closed form using a Euclidean and Spherical case, respectively:

$$c_{(u,l)} = \begin{cases} \frac{1}{\sum_{N \in \pi} 1} \sum_{N \in \pi} F_l \\ \frac{\sum_{N \in \pi} F_l}{\left\| \sum_{N \in \pi} F_l \right\|} \end{cases}$$

where $x = (F_1, F_2, \ldots, F_m)$.

3.3 The Method: Referring to FIG. 1B, the method of the invention uses the formulation of equation (1) using the steps below, wherein the distortion is measured of each individual cluster $\pi_u$, $1<u<k$, as:

$$\sum_{x \in \pi_u} D^\alpha(x, c_u),$$

and the quality of the entire partitioning $\{\pi_u\}_{u=1}^k$ as the combined distortion of all the k clusters:

$$\sum_{u=1}^k \sum_{x \in w_u} D^\alpha(x, c_u).$$

What is sought is k-disjoint clusters such that equation (3) as follows is minimized wherein these k-disjoint clusters are:

$\pi_1^\dagger, \pi_2^\dagger; \ldots, \pi_k^\dagger,$ and $$\{\pi_u^\dagger\}_{u=1}^k = \arg\min_{\{\pi_u\}_{u=1}^k} \left( \sum_{u=1}^k \sum_{x \in \pi_u} D^\alpha(x, c_u) \right), \quad (3)$$

where the feature weights $\alpha = (\alpha_1, \alpha_2, \ldots \alpha_m)$ are fixed. When only one of the weights $\{\alpha_1\}_{l=1}^m$ is nonzero, the maximization problem (3) is known to be NP-complete, meaning no known algorithm exists for solving the problem in polynomial time. K-means is used, which is an efficient and effective data clustering algorithm. Moreover, k-means can be thought of as a gradient ascent method, and, hence, never increases the objective function and eventually converges to a local minima.

In FIG. 1B, an overview of the processing components is shown for clustering data. These processing components perform data clustering on data records stored on a storage medium such as the computer system's hard disk drive 27. The data records typically are made up of a number of data fields or attributes. Examples of such data records are discussed below in the two examples implementing the invention.

The components that perform the clustering require three inputs: the number of clusters K, a set of K initial starting points, and the data records to be clustered. The clustering of data by these components produces a final solution as shown in step 5 as an output. Each of the K clusters of this final solution is represented by its mean (centroid) where each mean has d components equal to the number of attributes of the data records and a fixed feature weight of the m-feature spaces.

A refinement of feature weights in step 4 below produces better clustering from the data records to be clustered using the methodology of the invention. A most favorable refined starting point produced using a good approximation of an initial starting point is discussed below that would move the set of starting points that are closer to the modes of the data distribution.

At Step 1: An initial point with an arbitrary partitioning of the data records of the data records to be evaluated is provided, wherein, $\{\pi_u^{(o)}\}_{u=1}^k$. Let $\{c_u^{(o)}\}_{u=1}^k$ denote the generalized centroids associated with the given partitioning. Set the index of iteration i=0. A choice of the initial partitioning is quite crucial to finding a good local minima; to achieve this, see a method for doing this technique as taught in U.S. Pat. No. 6,115,708 hereby incorporated by reference.

At Step 2: For each data record $x_i$, $1 \leq i \leq n$, find the generalized centroid that is closest to $x_i$. Now, for $1<u<k$, compute the new partitioning $\{\pi_u^{(i+1)}\}_{u=1}^k$ induced by the old generalized centroids:

$$\{c_u^{(i)}\}_{u=1}^k: \pi_u^{(i+1)} = \{x \in \{x_i\}_{i=1}^n: D^\alpha(x, c_u^{(i)}) \leq D^\alpha(x, c_v^{(i)}), 1 \leq v \leq k\}. \quad (4)$$

In words, $\pi_u^{(i+1)}$ is the set of all data records that are closest to the generalized centroid $c_u^{(i)}$. If some data object is simultaneously closest to more than one generalized centroid, then it is randomly assigned to one of the clusters. Clusters defined using equation (4) are known as Voronoi or Dirichlet partitions.

Step 3: Compute the new generalized centroids $\{c_u^{(i+1)}\}_{u=1}^k$ $\pi_u^\dagger = \pi_u^{(i+1)}$ corresponding to the partitioning computed in equation (4) by using equations (1)–(2) where instead of $\pi_u$, the following is used: $\pi_u^{(i+1)}$.

Step 4: Optionally refine the features weights and store in memory using the method discussed in Section 4 below.

Step 5: If some stopping criterion is met, then set $c_u^\dagger = c_u^{(i+1)}$ for $1<u<k$, and exit at step 5 as the final clustering solution. Otherwise, increment i by 1, and go to step 2 above and repeat the process. An example of a stopping criterion is: Stop if the change in the objective function as defined in equation (6) below, between two successive iterations, is less than a specified threshold, for example the generalized centroids do not move and being less than a small floating point number.

4. Choice of the Feature Weights: Throughout this section, fix the number of clusters k<2 and fix the initial $\pi_u^\dagger = \pi_u^{(i+1)}$ partitioning used by the k-means algorithm in Step 1 above. Let:

$$\Delta = \left\{ \alpha \,\middle|\, \sum_{l=1}^m \alpha_l = 1, \alpha_l \geq 0, 1 \leq l \leq m \right\}$$

denote the set of all possible feature weights. Given a feature weight $\alpha \in \Delta$, $$\pi(\alpha) = \{\pi_u^i\}_{u=1}^k$$

denote the partitioning obtained by running the k-means algorithm with the fixed initial partitioning and the given feature weight. In principle, the k-means algorithm for every possible feature weight in $\Delta$ is run. From the set of all possible clusterings $\{\pi(\alpha)|\alpha \in \Delta\}$, select a clustering that is in some sense the best, by introducing a figure-of-merit to compare various clusterings. Fix a partitioning $\Pi(\alpha)$. By focusing on how well this partitioning clusters along the l-th, $1 \leq l \leq m$, component feature vector, the average within clusters distortion can be defined and average between cluster distortion along the l-th component feature vector, respectively, as:

$$\Gamma_l(\alpha) = \sum_{u=1}^{k} \sum_{x \in \pi_v} D_l(F_l, c_{(u,l)}^\dagger)$$

$$\Lambda_l(\alpha) = \frac{l}{k-1} \sum_{u=1}^{k} \sum_{x \in \pi_u} \sum_{v=1, v \neq u}^{k} D_l(F_l, c_{(u,l)}^\dagger),$$

where $x=(F_1, F_2, \ldots F_m)$. It is desirable to minimize $\Gamma_1(\alpha)$ and to maximize $\Lambda_1(\alpha)$, (i.e., coherent clusters that are well-separated from each other is desirable). Hence, minimize:

$$Q_l(\alpha) = \left(\frac{\Gamma_l(\alpha)}{\Lambda_l(\alpha)}\right)^{n_l ln} \quad (5)$$

where $n_l$ denotes the number of data records that have a non-zero feature vector along the l-th component. The quantity $n_l$ is introduced to accommodate sparse data sets. If the l-th feature space is simply $R^{f_l}$ and $D_1$ is the squared-Euclidean distance, the $\Gamma_1(\alpha)$ is simply the trace of the within-class covariance matrix and $\Lambda_1(\alpha)$ is the trace of the between class covariance matrix. In this case, $Q_1(\alpha)$ is the ratio used in determining the quality of a given classification, and as the objective function underlying this multiple discriminant analysis. Minimizing $Q_1(\alpha)$ leads to a good dicrimination along the l-the component feature space. Since it is desirable to simultaneously attain good discrimination along all the m feature spaces, the optimal feature weights $\alpha^\dagger$ are selected as:

$$\alpha^\dagger = \arg\min_{\alpha \in \Delta} \left[\prod_{l=1}^{m} Q_l(\alpha)\right]. \quad (6)$$

5. Evaluating Method Effectiveness: In assuming that the optimal weight tuple $\alpha^\dagger$ by minimizing the objective function in (6) has been selected. How good is the clustering corresponding to the optimal feature weight tuple? To answer this, assume that pre-classified data is given and benchmark the precision/recall performance of various clusterings against the given ground truth. Precision/recall numbers measure the overlap between a given clustering and the ground truth classification. This precision/recall numbers are not used in the selection of the optimal weight tuple, and are intended only to provide a way of evaluating utility of feature weighting. By using the precision/recall numbers to only compare partitionings with a fixed number of clusters k, that is, partitionings with the same model complexity, a measure of effectiveness is provided.

To meaningfully define precision/recall, conversion of the clusterings into classification using the following simple rule is made by identifying each cluster with the class that has the largest overlap with the cluster, and assign every element in that cluster to the found class. The rule allows multiple clusters to be assigned to a single class, but never assigns a single cluster to multiple classes. Suppose there are c classes $\{\omega_l\}_{l=1}^{c}$ in the ground truth classification. For a given clustering, by using the above rule, let $a_1$ denote the number of data records that are correctly assigned to the class $w_1$, and let $b_1$ denote the data records that are incorrectly rejected from the class $\omega_t$, let $b_1$ denote the data records that are incorrectly rejected from the class $\omega_t$. Precision and recall are defined as:

$$Pt = \frac{a_t}{a_t + h_c} = r_t = \frac{a_t}{a_t + c_t}, 1 \leq t \leq c,$$

The precision and recall are defined per class. Next, the performance averages across classes using macro-precision (macro-p), macro-recall (macro-r), micro-precision (micro-p), and miro-recall (micro-r) are captured by:

$$\text{macro-p} = \frac{1}{c}\sum_{t=1}^{c} p_t \text{ and macro-} r = \frac{1}{c}\sum_{t=1}^{c} r_t$$

$$\text{micro-p} \stackrel{(a)}{=} \text{micro-} r = \frac{1}{n}\sum_{t=1}^{c} a_t,$$

wherein (a) follows since, in this case, $$\Sigma_{t=1}^{c}(a_1+b_1)=\Sigma_{t=1}^{c}(a_1+c_1)=n.$$

6. Examples of Use of the Method of Clustering Data Sets with Numerical and Categorical Attributes 6.1 Data Model: Suppose a data set with both numerical and categorical features is given. By linearly scaling each numerical feature, that is, subtracting the mean and divide by the square-root of the variance. All linearly scaled numerical features into one feature space are clubbed, and, for this feature vector, the squared-Euclidean distance is used, by representing each q-ary categorical feature using a 1-in-q representation, and all of the categorical features are clubbed into a single feature space. Assuming no missing values, all the categorical feature vector have the same norm, by only retaining the direction of the categorical feature vectors, that is, normalizing each categorical feature vector to have an unit Euclidean norm, and use the cosine distance. Essentially, each data object x is represented as a m-tuple, m=2, of feature vectors $(F_1, F_2)$.

Figure 2A:
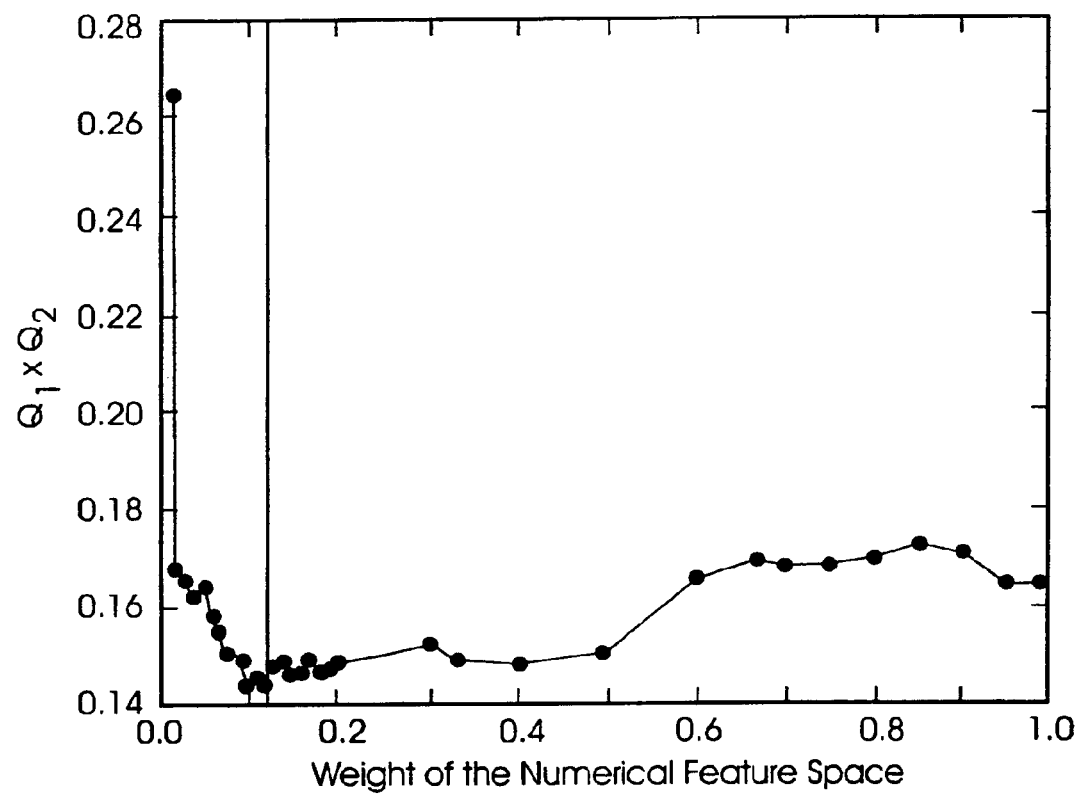
FIGS. 2A, 2B, 2C, and 2D show graphical results of an example using the invention.
Figure 2B:
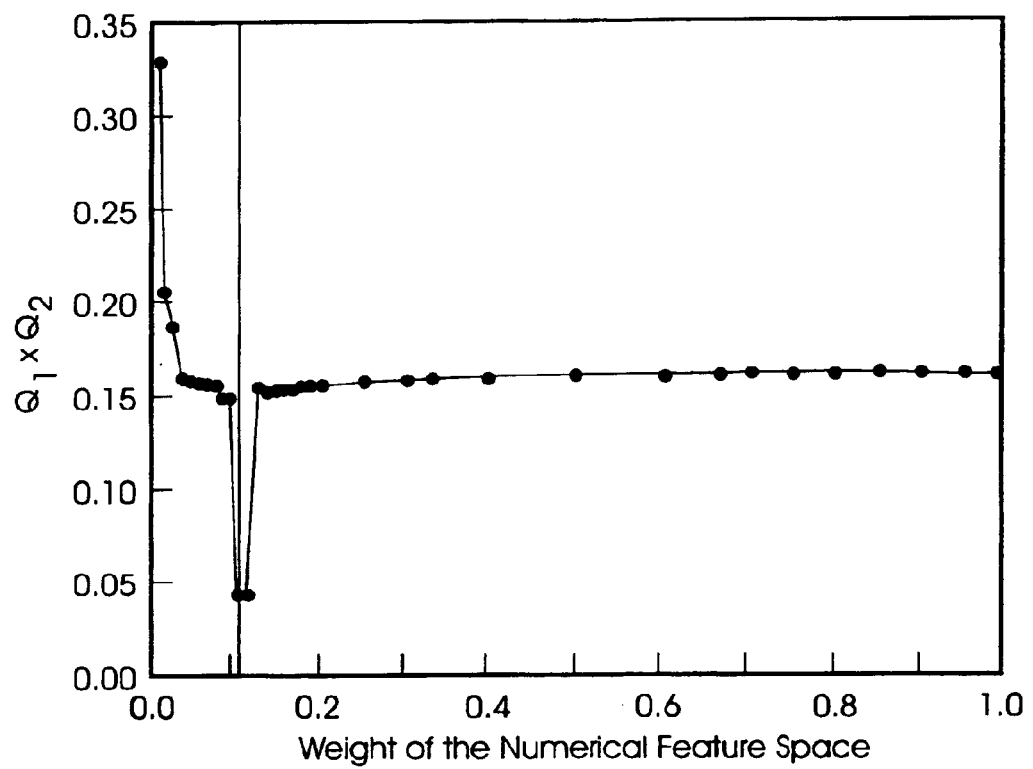
Figure 2C:
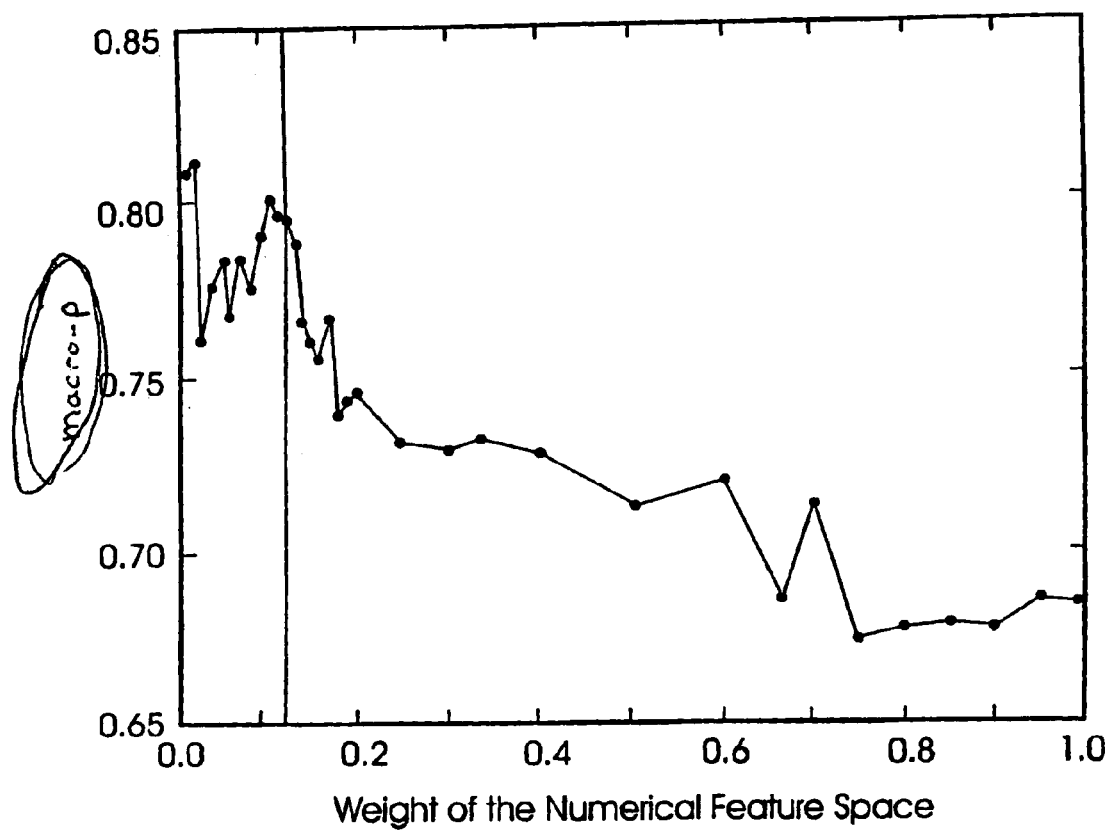
Figure 2D:
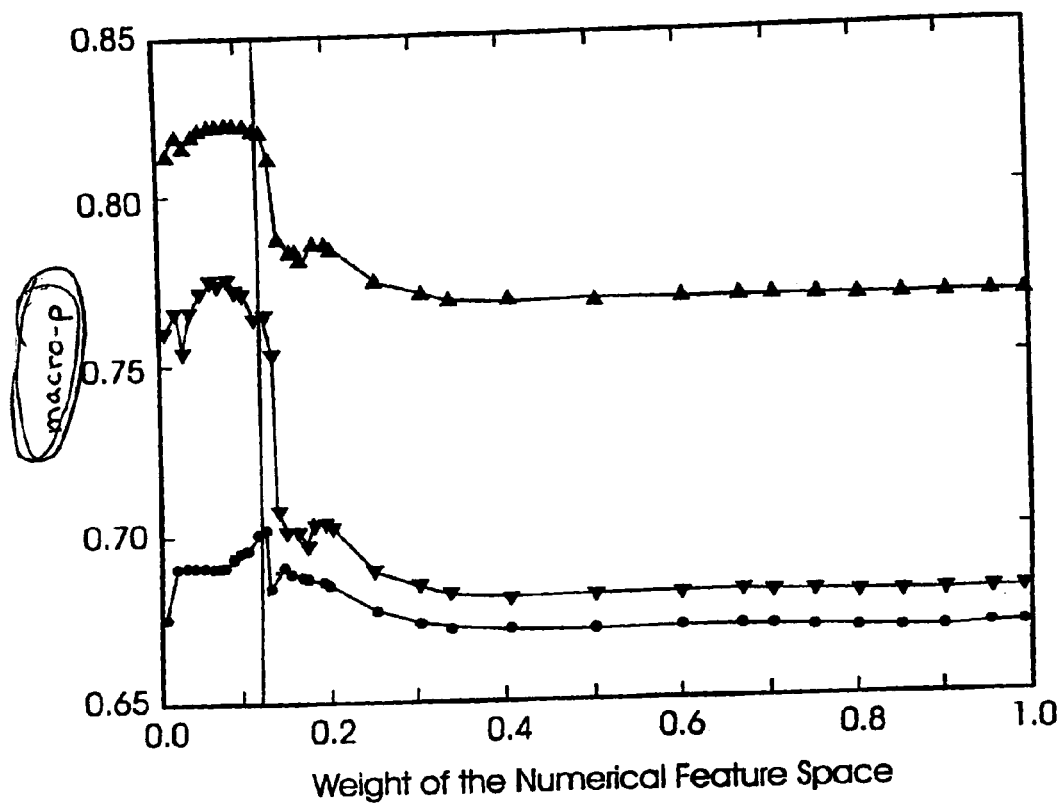

6.2 HEART and ADULT Data Sets: FIGS. 2A, 2B, 2C, and 2D show graphs of a first example using the method of the invention using HEART (resp. ADULT) data, further defined below. FIGS. 1A and 1B respectively, each show a plot of the objective function Q1×Q2 in equation (6) versus the weight c~x. The vertical lines in FIGS. 2A, 2B, 2C, and 2D indicate the position of the optimal weight tuples. For the HEART (resp. ADULT) data, FIGS. 2C and 2D respectively, each show a plot of macro-p (resp. micro-p, macro-p, and macro-r) versus the weight $\alpha_1$. For the HEART data, macro-p, macro-r, and micro-p numbers are very close to each other, thus, to avoid visual clutter, only plotted macro-p numbers are shown. For the ADULT data, the top, the middle, and bottom plots in FIG. 2D are micro-p, macro-p, and macro-r.

The HEART data set consists of n=270 instances, and can be obtained from the STATLOG repository. Every instance consists of 7 numerical and 6 categorical features. The data set has two classes: absence and presence of heart disease; 55.56% (resp. 44.44%) instances were in the former (resp. later) class. The ADULT data set consists of n=32561 instances that were extracted from the 1994 Census database. Every instance consists of 6 numerical and 8 categorical features. The data set has two classes: those with income less than or equal to $50,000 and those with income more than $50,000; 75.22% (resp. 24.78%) instances were in the former (resp. later) class.

6.3 The Optimal Weights: In this case, the set of feasible weights is $$\Delta = \{(\alpha_1, \alpha_2) | \alpha_1 + \alpha_2 = 1, \alpha_1, \alpha_2 \geq 0\}.$$

The number of clusters k=8 is selected, and a binary search on the weight $\alpha_1 \in [0,1]$ is done to minimize the objective function in equation (6).

For the HEART (resp. ADULT) data, FIGS. 2A and 2B, respectively show a plot of the objective function $Q_1 \times Q_2$ in (6) versus the weight $\alpha_1$. For the HEART and ADULT data sets, the objective function is minimized by the weights (0.12, 0.88) and (0.11, 0.89), respectively.

For the HEART (resp. ADULT) data, FIGS. 2C and 2D, respectively show a plot of macro-p (resp. micro-p, macro-p, and macro-r) versus the weight $\alpha_1$. By comparing FIG. 2A with FIG. 2C, and FIG. 2B with FIG. 2D, it can be seen that, roughly, macro-p (resp. micro-p, macro-p, and macro-r) are negatively correlated with the objective function $Q_1 \times Q_2$ and that, in fact, the optimal weight tuples achieve nearly optimal precision and recall. In conclusion, optimizing the objective function $Q_1 \times Q_2$ leads, reassuringly, to optimizing the precision/recall performance, thus leads to good clusterings and a final solution.

7. Second Example of Using the Method of Clustering Text Data using Words and Phrases as the Feature Spaces 7.1. Phrases in Information Retrieval: Vector space models, represent each document as a vector of certain (possibly weighted and normalized) term frequencies. Typically, terms are single words. However, to capture word ordering, it is intuitive to also include multi-word sequences, namely, phrases, as terms. The use of phrases as terms in vector space models has been well studied. In the example as follows, the phrases along with the words in a single vector space model are not a club. For information retrieval, when single words are also simultaneously used, it is known that natural language phrases do not perform significantly better than statistical phrases. Hence, the focus is on statistical phrases which are simpler to extract, see, for example, see Agrawal et al. in "Mining sequential patterns," *Proc. Int. Conf. Data Eng.*, (1995). Also, see Mladenic et al., "Word sequences as features in text-learning" in *Proc. 7th Electrotech Computer Science Conference, Ljubljana, Slovenia*, pages 145–148, (1998) found that while adding 2- and 3-word phrases improved the classifier performance, longer phrases did not. Hence, the example illustrates single words, 2-word phrases and 3-word phrases.

Figure 3:
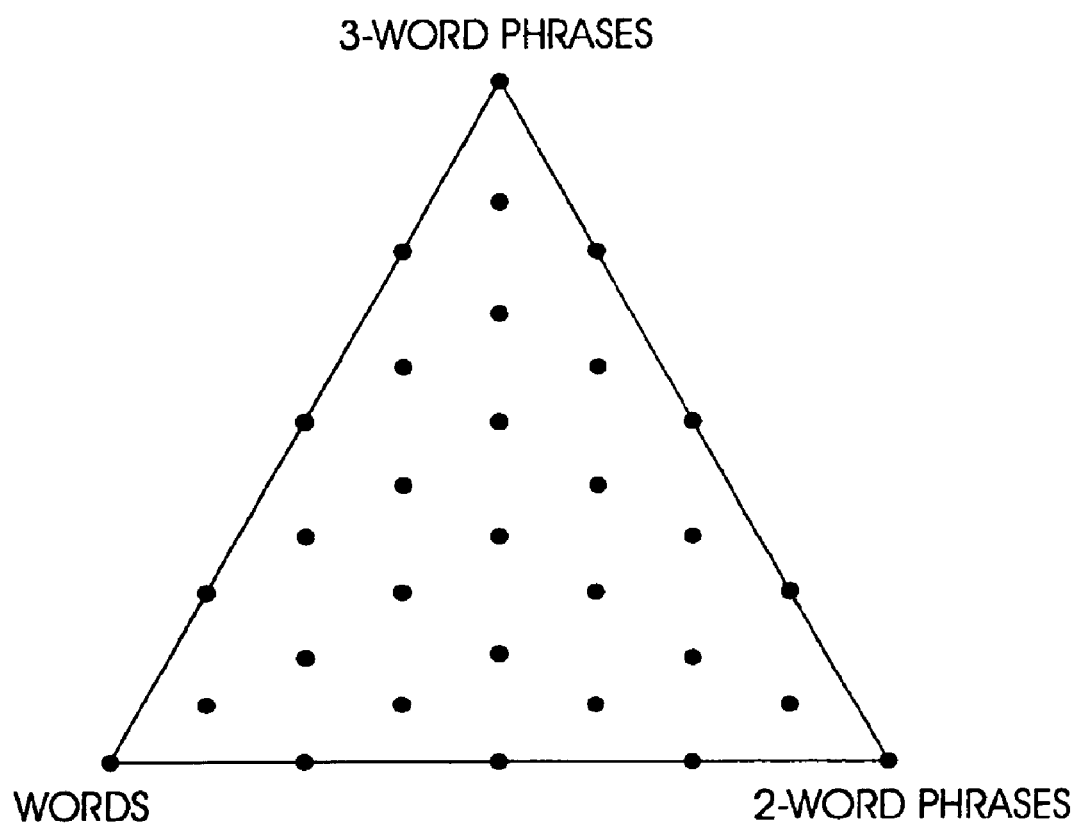
FIG. 3 shows the feasible weights for the second exemplary use of the invention wherein when the feature space is 3, and the triangular region formed by the intersection of the plane at $\alpha_1 + \alpha_2 + \alpha_3 = 1$ with the nonnegative orthant of $R^3$.

7.2 Data Model: FIG. 3 shows the feasible weights for the second exemplary use of the invention wherein when m=3, $\Delta$ is the triangular region formed by the intersection of the plane at $\alpha_1 + \alpha_2 + \alpha_3 = 1$ with the nonnegative orthant of $R^3$. The left-vertex, the right-vertex, and the top-vertex of the triangle corresponds to the points (1, 0, 0), (0, 1, 0), and (0, 0, 1), respectively. Each document is represented as a triplet of three vectors: a vector of word frequencies, a vector of 2-word phrase frequencies, and a vector of 3-word frequencies, that is, $\alpha = (F_1, F_2, F_3)$. It is now shown how to compute such representations for every document in a given corpus. This creation of the first feature vector is a standard exercise in information retrieval. The basic idea is to construct a word dictionary of all the words that appear in any of the documents in the corpus, and to prune or eliminate a stop word from this dictionary. For the present application, also eliminated are those low-frequency words which appeared in less that 0.64% of the documents. Suppose $f_1$ unique words remain in the dictionary after such elimination. Assign an unique identifier from 1 to $f_1$ to each of these words. Now, for each document x in the corpus, the first vector $f_1$ in the triplet will be a $f_1$ dimensional vector. The jth column entry, $1 < j \leq f_2$, of $F_1$ is the number of occurrences of the jth word in the document x. Creation of the second (resp. third) feature vector is essentially the same as the first, except that the low-frequency 2-word (resp. 3-word) phrase elimination threshold to one-half (resp. 3-word) phrase is generally less likely than a single word. Let $f_2$ (resp. $f_3$) denote the dimensionalities of the second (resp. third) feature vector. Finally, each of the three components $F_1$, $F_2$, $F_3$ is normalized to have a unit Euclidean norm, that is, their directions are retained and their lengths are discarded. There are a large number of term-weighting schemes in information retrieval for assigning different relative importance to various terms in the feature vectors. These feature vectors correspond to a poplar scheme known as normalized term frequency. The distortion measures $D_1$, $D_2$, and $D_3$ are the cosine distances.

7.3 Newsgroups Data: Picked out of the following 10 newsgroups from the "Newsgroups data" from a newspaper to illustrate the invention: misc.forsale

| sci.crypt | comp.windows.x | Comp.sys.mac.hardware |
| rec.autos | rec.sport.baseball | soc.religion.christian |
| sci.space | talk.politics.guns | talk.politics.mideast |

Each newsgroup contains 1000 documents; after removing empty documents, a total of n 9961 documents exist. For this data set, the unpruned word (resp. 2-word phrase and 3-word phrase) dictionary had size 72586 (resp. 429604 and 461132) out of which $f_1$=2583 (resp. $f_2$=2144 and $f_2$=2268) elements that appeared in at least 64 (resp. 32 and 16) documents was retained. All the three features spaces were highly sparse; on an average, after pruning, each document had only 50 (resp. 7.19 and 8.34) words (resp. 2-word and 3-word phrases). Finally, $n_1$–n–9961 (resp. $n_2$=8639 and $n_3$=4664) documents had at least one word (resp. 2-word phrase and 3-word phrase). Note that the numbers $n_1$, $n_2$, and $n_3$ are used in equation (5) above.

Figure 4:
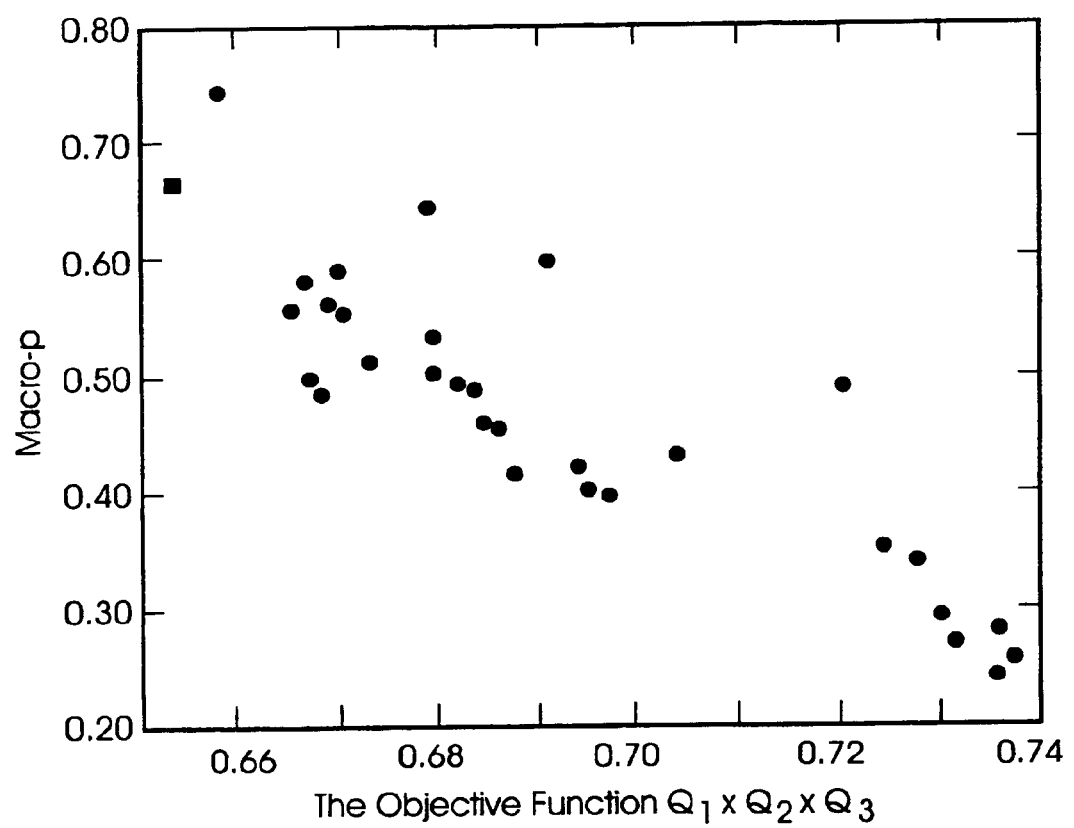
FIG. 4 shows a newsgroups data set, in which plot macro-p versus the objective function $Q_1 \times Q_2 \times Q_3$ for various different weight tuples.

7.4 The Optimal Weights: FIG. 4 shows a newsgroups data set, in which plot macro-p versus the objective function $Q_1 \times Q_2 \times Q_3$ for various different weight tuples. The macro-p value corresponding to the optimal weight tuple is shown using the symbol ■, and others are shown using the symbol ●. The negative correlation between macro-p and the objective function is evident from the plot. Macro-p, macro-r, and micro-p numbers are very close to each other, thus, to avoid visual clutter, only plotted macro-p numbers are shown. In this case, the set of feasible weights is the triangular region shown in FIG. 4. The k-means algorithm with k=10 on the Newsgroups data set with 31 different feature weights are shown using the symbol ● in FIG. 4. The objective function in equation (6) is minimized by a weight tuple (0.50, 0.25, 0.25).

Further, FIG. 4 roughly shows that as the objective function decreases, macro-p increases. The objective function corresponding to the optimal weight tuple is plotted using the symbol; by definition, this is the left-most point on the plot. It can be seen that the optimal weight tuple has a smaller macro-p value than only one other weight tuple, namely, (0.495, 0.010, 0.495). Although macro-r and micro-p results are not shown, they lead to the same conclusions. Use of the precision/recall numbers reveals that optimal feature weighting provides good final data clustering.

As discussed above, it has been assumed that the number of clusters k is given; however, an important problem that the invention can be used for is to automatically determine the number of clusters in an adaptive or data-driven fashion using information-theoretic criteria such as the MDL principle. A computationally efficient gradient descent procedure for computing the optimal parameter tuple $\alpha\dagger$ can be used. This entails combining the optimization problems in equation (6) and in equation (3) into a single problem that can be solved using iterative gradient descent heuristics for the squared-Euclidean distance. In the method of the invention, the new weighted distortion measure $D^\alpha$ has been used in the k-means algorithm; it may also be possible to use this weighted distortion with a graph-based algorithm such as the complete link method or with hierarchical agglomerative clustering algorithms.

In summary, the invention provides a method for obtaining good data clustering by integrating multiple, heterogeneous feature spaces in the k-means clustering algorithm by adaptively selecting relative weights assigned to various features spaces while simultaneously attaining good separation along all the feature spaces.

Figure 5:
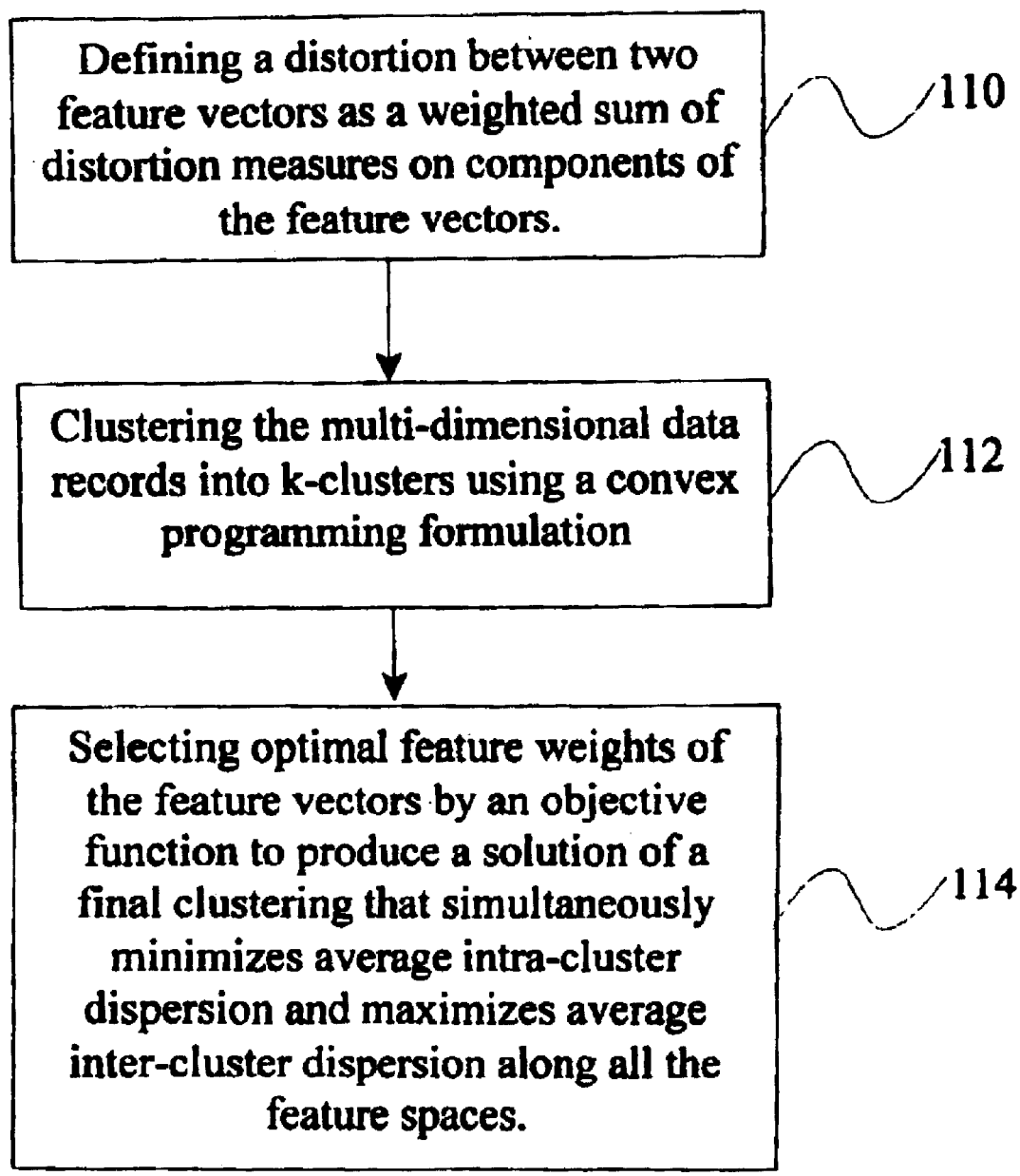
FIG. 5 is a flowchart illustrating a preferred method of the invention.

Moreover, FIG. 5 illustrates a preferred method of the invention fully described above, where a method for evaluating and outputting a clustering solution for a plurality of multi-dimensional data records comprises defining (110) a distortion between two feature vectors as a weighted sum of distortion measures on components of the feature vectors; clustering (112) the multi-dimensional data records into k-clusters using a convex programming formulation; and selecting (114) optimal feature weights of the feature vectors by an objective function to produce a solution of a final clustering that simultaneously minimizes average intra-cluster dispersion and maximizes average inter-cluster dispersion along all the feature spaces.

While the preferred embodiment of the present invention has been illustrated in detail, it should be apparent that modifications and adaptations to that embodiment may occur to one skilled in the art without departing from the spirit or scope of the present invention as set forth in the following claims.

What is claimed is:

1. A method for evaluating and outputting a final clustering solution for a plurality of multi-dimensional data records, said data records having multiple, heterogeneous feature spaces represented by feature vectors, said method comprising:

defining a distortion between two feature vectors as a weighted sum of distortion measures on components of said feature vectors;

clustering said multi-dimensional data records into k-clusters using a convex programming formulation;

selecting feature weights of said feature vectors, and minimizing distortion of said k-clusters.

2. The method according to claim 1, wherein said selecting of feature weights is optimized by an objective function to produce said final clustering solution that simultaneously minimizes average intra-cluster dispersion and maximizes average inter-cluster dispersions along all said heterogeneous feature spaces.

3. The method according to claim 1, wherein said clustering includes initially applying a local minima of said clustering.

4. The method of claim 1, wherein said clustering comprises a k-means clustering algorithm.

5. The method of claim 2, wherein said minimizing distortion of individual clusters includes taking said data records and iteratively determining Voronoi partitions until said objective function, between two successive iterations, is less than a specified threshold.

6. The method of claim 1, wherein said clustering comprises analyzing word data, and said feature vectors comprise multiple-word frequencies of said data records.

7. The method of claim 1, wherein said clustering comprises analyzing data records having numerical and categorical attributes, and said feature vectors comprise linearly-scaled numeral attributes.

8. A method for evaluating and outputting a clustering solution for a plurality of multi-dimensional data records, said data records having multiple, heterogeneous feature spaces represented by feature vectors, said method comprising:

defining a distortion between two said feature vectors as a weighted sum of distortion measures on components of said feature vectors;

clustering said multi-dimensional data records into k-clusters using a convex programming formulation of a generalized k-means clustering function; and selecting optimal feature weights of said feature vectors by an objective function to produce said solution of a final clustering that simultaneously minimizes average intra-cluster dispersion and maximizes average inter-cluster dispersion along all said feature spaces.

9. The method of claim 8, wherein said clustering includes initially applying a local minima of said clustering.

10. The method of claim 8, wherein said minimizing distortion of individual clusters includes taking said data records and iteratively determining Voronoi partitions until said objective function, between two successive iterations, is less than a specified threshold.

11. The method of claim 8, wherein said clustering comprises analyzing word data, and said feature vectors comprise multiple-word frequencies of said data records.

12. The method of claim 8, wherein said clustering comprises analyzing data records having numerical and categorical attributes, and said feature vectors comprise linearly-scaled numerical attributes.

13. A computer system for data mining and outputting a final clustering solution, wherein said system includes a memory for storing a database having a plurality of multi-dimensional data records, each having multiple, heterogeneous feature spaces represented by feature vectors, said system including a processor for executing instructions comprising:

defining a distortion between two feature vectors as a weighted sum of distortion measures on components of said feature vectors;

clustering said multi-dimensional data records into k-clusters using a convex programming formulation; and selecting feature weights of said feature vectors, wherein said instruction for selecting said feature weights are optimized by implementing an objective function to produce said solution of a final clustering that simultaneously minimizes average intra-cluster dispersion and maximizes average inter-cluster dispersion along all said feature spaces.

14. The system of claim 13, wherein said instruction for clustering includes instructions for analyzing data records having numerical and categorical attributes.

15. The system of claim 13, wherein said instruction of said clustering includes an instruction for initially applying a local minima of said clustering.

16. The system of claim 13, wherein said instruction for clustering includes instructions for implementing a k-means clustering algorithm.

17. The system of claim 13, further comprising an instruction for minimizing distortion of individual clusters including taking said data records and iteratively determining Voronoi partitions until said objective function, between two successive iterations, is less than a specified threshold.

18. The system of claim 13, wherein said instruction for clustering includes instructions for analyzing word data.

19. A program storage device readable by machine, tangibly embodying a program of instructions executable by said machine to perform a method for evaluating and outputting a final clustering solution from a set of data records having multiple, heterogeneous feature spaces represented as feature vectors, said method comprising:

defining a distortion between two feature vectors as a weighted sum of distortion measures on components of said feature vectors;

clustering said multi-dimensional data records into k-clusters using a convex programming formulation; and selecting feature weights of said feature vectors, wherein said selecting of feature weights are optimized by an objective function to produce said solution of a final clustering that simultaneously minimizes average intra-cluster dispersion and maximizes average inter-cluster dispersion along all said feature spaces.

20. The device of claim 19, wherein said clustering comprises analyzing word data, and said feature vectors comprise multiple-word frequencies of said data records.

21. The device of claim 19, wherein said clustering comprises analyzing data records having numerical and categorical attributes, and said feature vectors comprise linearly-scaled numerical attributes.

22. The device of claim 19, wherein aid clustering includes initially applying a local minima of said clustering.

23. The device of claim 19, wherein said clustering comprises a k-means clustering algorithm.

24. The device of claim 19, wherein said minimizing distortion of individual clusters includes taking said data records and iteratively determining Voronoi partitions until said objective function, between two successive iterations, is less than a specified threshold.

* * * * *